US008078175B2

(12) United States Patent
Salkintzis et al.

(10) Patent No.: US 8,078,175 B2
(45) Date of Patent: Dec. 13, 2011

(54) METHOD FOR FACILITATING A HANDOVER OF A COMMUNICATION DEVICE, COMMUNICATION DEVICE, APPLICATION SERVER FOR FACILITATING A HANDOVER OF A COMMUNICATION DEVICE, AND COMMUNICATION SYSTEM ARRANGEMENT

(75) Inventors: Apostolis K. Salkintzis, Athens (GR); Howard P. Benn, Swindon (GB); Kenneth A. Stewart, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 138 days.

(21) Appl. No.: 12/723,941

(22) Filed: Mar. 15, 2010

(65) Prior Publication Data
US 2011/0223885 A1   Sep. 15, 2011

(51) Int. Cl.
*H04Q 7/20* (2006.01)
(52) U.S. Cl. ......... 455/436; 370/352; 370/356; 370/331
(58) Field of Classification Search ............... 455/436, 455/561, 437; 370/351, 356, 357, 331
See application file for complete search history.

(56) References Cited

U.S. PATENT DOCUMENTS

| 7,277,703 | B2 * | 10/2007 | Saglam et al. | 455/434 |
| 7,916,715 | B2 * | 3/2011 | Rezaiifar et al. | 370/352 |
| 2006/0002355 | A1 | 1/2006 | Baek et al. | |

FOREIGN PATENT DOCUMENTS
WO   2009009519 A1   1/2009

OTHER PUBLICATIONS

Patent Cooperation Treaty, "PCT Search Report and Written Opinion of the International Searching Authority" for International Application No. PCT/US2011/026597 Jun. 22, 2011, 13 pages.
Hyun-Ho Choi et al "Seamless Handoff Scheme Based on Pre-registration and Pre-authentication for UMTS-WLAN Interworking", Wireless Personal Communications, Kluwer Academic Publishers, DO, vol. 41, No. 3, Aug. 23, 2006, pp. 345-364.

\* cited by examiner

*Primary Examiner* — Phuoc Doan
(74) *Attorney, Agent, or Firm* — Roland K. Bowler, II; Sarah Gibson (57) ABSTRACT

A method for facilitating a handover of a communication device (202) active on a first radio access network (210) to a second radio access network (206) comprises while the communication device is active on the first radio access network (210), detecting (502) a target access node (216) in the second radio access network for communication with the communication device, deciding (540) to handover the communication device from the first radio access network to the detected target access node, in response to a decision to handover and prior to handing over, initiating (506) by the communication device an access control process to authenticate and authorize the communication device for access to the second radio access network, including sending by the communication device a handover request message via the first radio access network to an application server (222) communicably coupled to the first and second radio access networks to initiate the access control process, and after the communication device is authenticated and authorized to access the second radio access network while the communication device is still active on the first radio access network, initiating (510) communication between the communication device and the detected target access node in the second radio access network and handing over the communication device from the first radio access network to the detected target access node.

19 Claims, 7 Drawing Sheets

METHOD FOR FACILITATING A HANDOVER OF A COMMUNICATION DEVICE, COMMUNICATION DEVICE, APPLICATION SERVER FOR FACILITATING A HANDOVER OF A COMMUNICATION DEVICE, AND COMMUNICATION SYSTEM ARRANGEMENT

FIELD OF THE DISCLOSURE

This disclosure relates to a method for facilitating a handover of a communication device, a communication device, an application server for facilitating a handover of a communication device and a communication system arrangement.

BACKGROUND OF THE DISCLOSURE

A number of different air interfaces or radio access technologies have been developed and deployed via radio access networks in wireless communication systems to facilitate the provision of wireless communication services to users. These include, for example, wide area access networks, such as the GSM Radio Access Network (GRAN) of a GSM communication system, a GSM EDGE Radio Access Network (GERAN) of an EDGE enhanced GSM communication system, a UMTS RAN (UTRAN) of a UMTS communication system, an Evolved UTRAN (E-UTRAN) of a Long Term Evolution (LTE) system, and other radio access networks based on Wideband Code Division Multiple Access (WCDMA) technology and wireless access networks, such as wireless LAN (WLAN), Worldwide Interoperability for Microwave Access (WiMax) based networks and Wi-Fi based networks.

Communication devices that can support different radio access technologies, and so can communicate with different access networks, have also been developed. Such devices are sometimes called multi-mode devices. Such multi-mode devices may typically include several radio interfaces with each radio interface supporting a particular radio access technology.

When multi-mode communication devices are located in overlapping coverage areas of different access networks, it is possible to transfer communication between the different access networks of the communication systems. Typically, multi-mode communication devices that are capable of operating with multiple communication systems will have a preferred communication system out of the multiple communication system. The preferred communication system may be determined according to parameters, such as, what services are available on each of the communication systems, cost of services, Quality of Service (QoS), network identification and potentially user preference.

For example, a communication device, which is capable of communicating with a wide area network (such as a UTRAN of a UMTS communication system) and a WLAN and which is currently active and communicating via the UTRAN to access an external data network (e.g. a server connected to the internet), communicates with the external data network via a radio communication link with a base station of the coverage area or cell within which the communication device is situated currently. In UMTS, the base stations, which are part of the UTRAN, are known as Node Bs and a communication device is known as User Equipment (UE). If the UE moves into a coverage area of the WLAN communication system, normally the UE would handover to the WLAN as the preferred communication system: for example, to reduce battery consumption in the UE compared to communicating via the UTRAN.

The typical method to conduct a handover from a UTRAN to WLAN requires the UE to operate both the UTRAN and the WLAN radio interfaces simultaneously during the handover procedure. This is required because otherwise the handover latency would be too large. Thus, in the example given above, the UE performs a handover by activating the WLAN radio interface while the UTRAN radio interface is concurrently used for data communications with the server connected to the internet and executes a WLAN access control process and IP address allocation with Dynamic Host Configuration Protocol (DHCP). The WLAN access control process includes authentication and authorization procedures performed by an Authentication, Authorization and Accounting (AAA) server in the core network, and is typically time-consuming, especially when the UE is roaming when the HOME AAA server is required to authenticate the UE via a visited AAA server/proxy. The WLAN access control process involves communications between the WLAN radio interface of the UE and the WLAN and the WLAN and the AAA server. Once the WLAN access control process has been successfully completed (e.g. the UE is authenticated and authorised to access the WLAN), the UE releases the TCP connection with the server over the UTRAN radio interface and establishes a new TCP connection over the WLAN interface. Subsequently, communication with the server connected to the internet resumes.

If this handover procedure takes place when no data exchange is ongoing between the UE and the server, then normally no issues exist. If, however, the handover takes place during communication between the UE and the server, such as for example during an ongoing photo download, the communication (e.g. download) will be interrupted when the old TCP connection (over the UTRAN) is closed. When the new TCP connection is established, the previous communication will have to be restarted. For example, the UE will have to request again the same photo and the download will start from the very beginning. This makes the handover very inefficient since the original photo download cannot be resumed.

Figure 1:
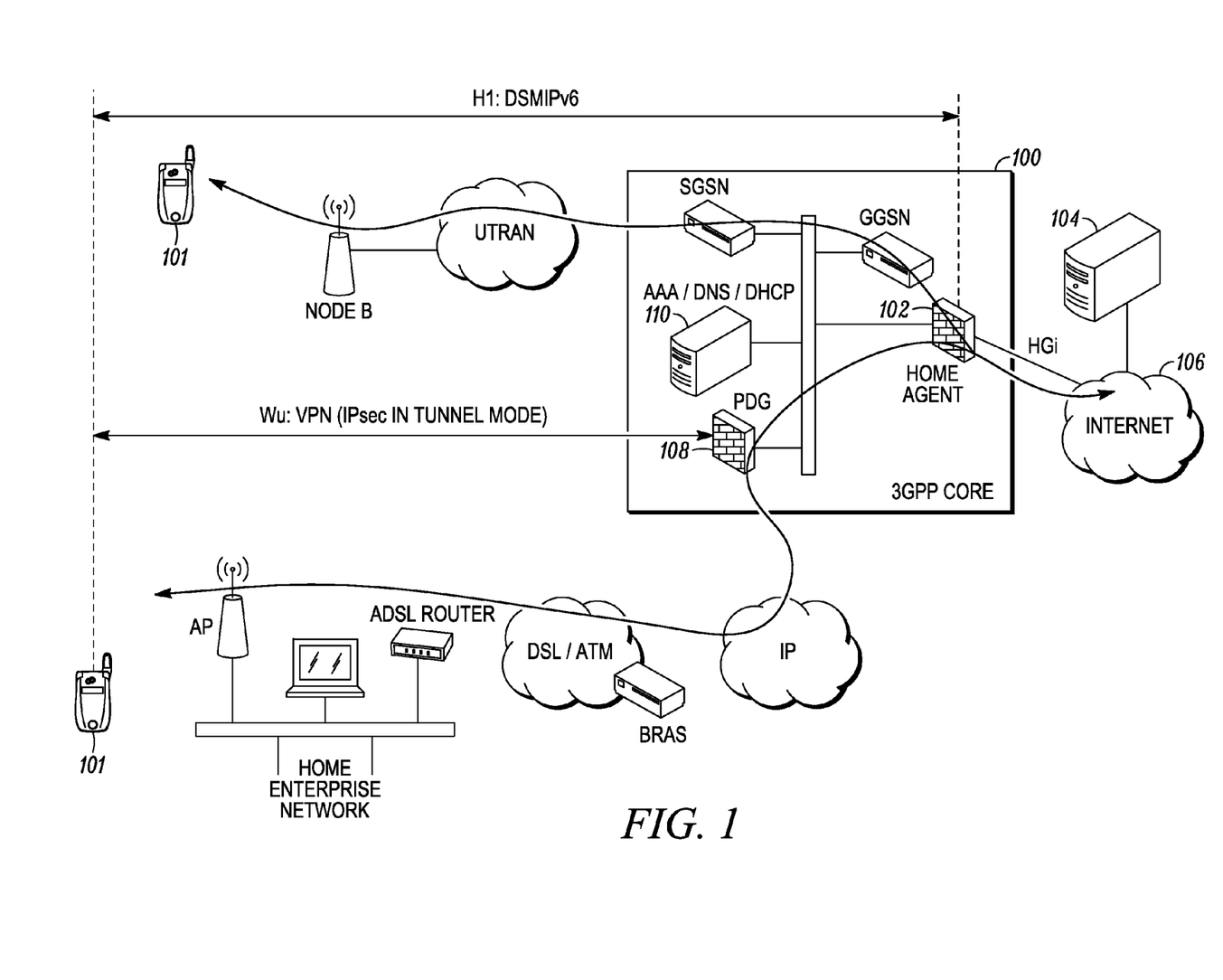
FIG. 1 is a block schematic diagram of a communication system arrangement implementing the mobility solution defined in TS 23.327.

A mobility solution has been standardized by 3GPP in Technical Specification TS 23.327 in order to address this inefficiency. This is shown in FIG. 1. A home agent 102 is introduced in the 3GPP core network 100 to hide the mobility of the UE 101 from the server 104 connected to the external data network 106 (e.g. the internet) so the above issue data communication (e.g. photo download) interruption and restart does not occur. However, the UE 101 is still required to operate simultaneously the wide-area (e.g. UTRAN) and the WLAN radio interfaces because of the time required to perform the WLAN access control process via the AAA server 110. Some UEs cannot support simultaneous communications due to device limitations. For those UEs that can support simultaneous communications, co-existence issues between the different radio interfaces, such as high adjacent channel interference and high specific absorption rate (SAR), may arise. In addition, the UE 101 is required to implement Dual Stack Mobile IPv6 (DSMIPv6) protocol for mobility control and to setup a Virtual Private Network (VPN) with the Packet Data Gateway (PDG) 108 to cipher and integrity-protect the data communication. This is all very demanding and power consuming for the UE 101.

BRIEF DESCRIPTION OF THE DRAWINGS

A method for facilitating a handover of a communication device, a communication device, an application server for facilitating a handover of a communication device and a communication system arrangement in accordance with different aspects of the disclosure will now be described, by way of example only, with reference to the accompanying drawings in which.

DETAILED DESCRIPTION OF THE DRAWINGS

The present disclosure will be described with reference to a communication device capable of operating with a first radio access network and a second radio access network, with the first radio access network being a UTRAN which is part of a UMTS communication system and the second radio access network being a WLAN which is part of an unlicensed WLAN communication system. It will however be appreciated that the present disclosure may apply to communication devices capable of operating with any combination of two or more different radio access networks of different communication systems, which may be selected from, for example: GSM; Enhanced Data rates for GSM Evolution (EDGE); General Packet Radio System (GPRS); CDMA, such as IS-95; WCDMA or Universal Mobile Telecommunications System (UMTS); Fourth Generation Long Term Evolution (LTE); other wide area network communication systems; Private Mobile Radio (PMR); Wireless Local Area Networks (WLAN); Worldwide Interoperability for Microwave Access (WIMAX); Wi-Fi; Bluetooth; or the like. By describing the disclosure with respect to UTRAN and WLAN, it is not intended to limit the disclosure in any way.

Figure 2:
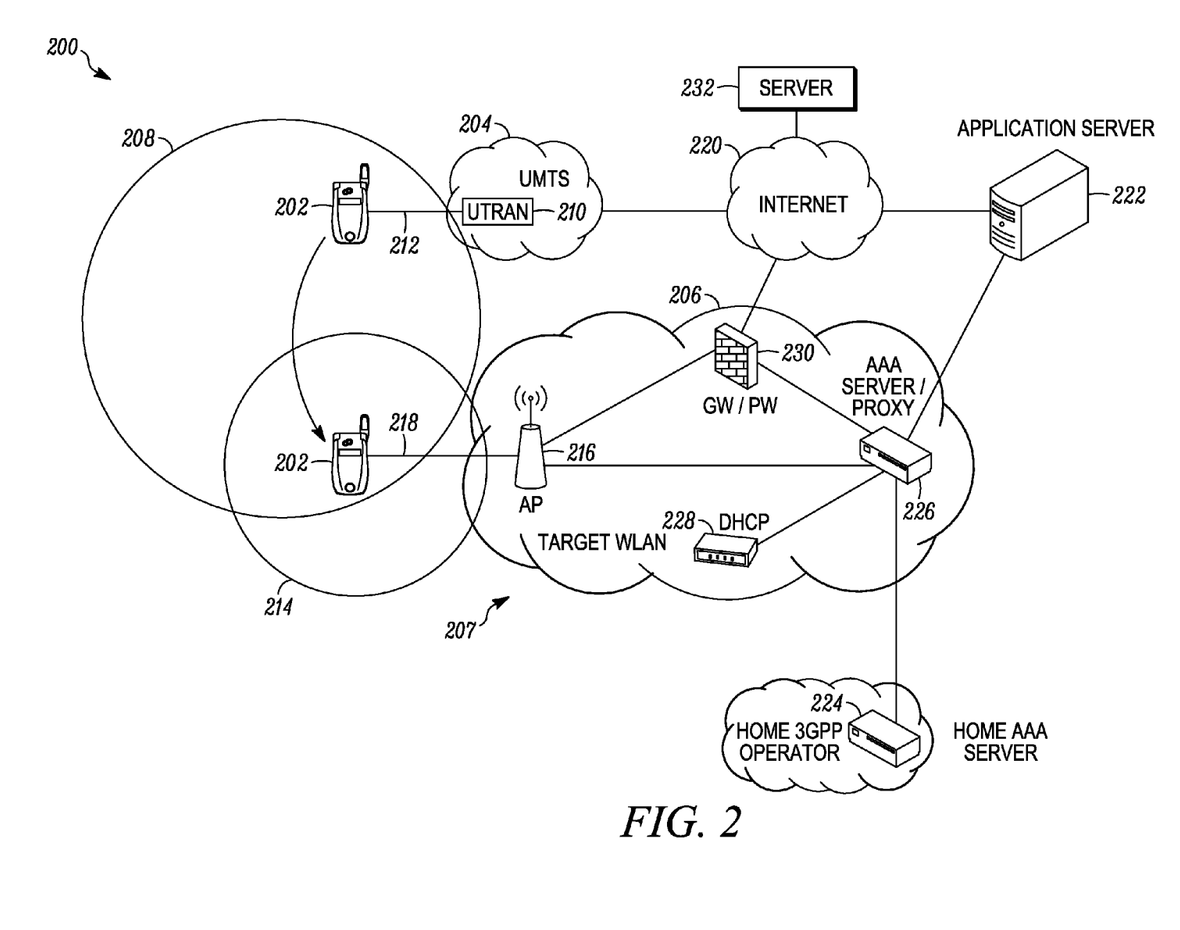
FIG. 2 is a block schematic diagram of a communication system arrangement in accordance with an example of an embodiment of the present disclosure.

Referring firstly to FIG. 2, a communication system arrangement 200 in accordance with an example of an embodiment of the disclosure comprises at least one communication device 202 (but typically a plurality of communication devices), capable of communicating with a first radio access network, such as UTRAN 210 of a UMTS communication system 204 and a second radio access network 206, such as WLAN 206 of a WLAN communication system 207. The UMTS communication system 204 provides a plurality of coverage areas or cells, such as coverage area or cell 208, served by UTRAN 210 as is well known in the art. The communication device 202 can operate or communicate with the UMTS communication system 204 via radio communication link 212. The WLAN 206 provides a coverage area 214 served by access point (AP) 216. The communication device 202 can operate or communicate with the WLAN 206 via radio communication link 218. It will be appreciated that although only coverage area 208 is shown in FIG. 2, the UMTS communication system 204 has a plurality of coverage areas and each coverage area is served by one or more Node Bs (not shown) which are part of the UTRAN 210. In addition, the WLAN communication system 207 may have a plurality of access points APs and a plurality of WLANs 206 and may be part of a larger Unlicensed Mobile Access (UMA) communication system.

The communication system arrangement 200 further comprises an application server 222 communicably coupled to UTRAN 210 and WLAN 206 and being arranged to facilitate a handover of communication device 202 so as to minimise interruption to the communication with the communication device 202. In an example arrangement, communication with the application server 222 is IP based and so the application server 222 may be any entity and may be located anywhere such that it provides IP connectivity. For example, the application server 222 may be coupled to the UMTS communication system 204 via the Internet or alternatively, it may be located inside the UMTS core network. In an example arrangement, the application server 222 uses the IP protocol for communication and the communication device 202 is arranged to establish IP communications with it. The IP address of the application server 222 may be either preconfigured in the communication device 202 or may be discovered via normal DNS or DHCP procedures.

As discussed in the introduction, the communication device 202 may have a preferred communication system which may be determined according parameters such as what services are available on each of the communication systems, cost of services, Quality of Service (QoS), network identification and potentially user preference. When the communication device 202 is located in the coverage area of the preferred communication system, typically it will be arranged such that the communication device 202 is active on the preferred communication system, and so, if necessary, a handover to the preferred communication system will be performed.

For example, in the case when the WLAN communication system 207 is the preferred system for the communication device 202, when the communication device 202 is located in coverage area 208 and is active on UTRAN 210 and is communicating with a server 232 via an external data network, such as the internet 220, and the communication device 202 then moves into coverage area 214, the application sever 222 may be arranged to facilitate a handover of the communication device 202 and the ongoing communications from the UTRAN 210 to the WLAN 206. It will be appreciated that instead of the communication device 202 communicating with another server (such as server 232) or entity, the communication device 202 may be communicating with the application server 222 itself. In this situation, the application server 222 facilitates handover of the communication device 202 so that interruptions in the communication between the communication device 202 and the application server 222 are minimised.

The communication system arrangement 200 may further comprise a home AAA server 224. The home AAA server 224 is part of the home operator's network and is arranged to perform an access control process which typically includes authenticating and authorising the communication device for access to a particular radio access network.

WLAN 206 may include a gateway and firewall element (GW/FW) 230, a Dynamic Host Configuration Protocol (DHCP) server 228 and an AAA server/proxy 226. The AAA server/proxy 226 is used when the communication device 202 is roaming and moves into coverage area 214 so that the access control process is performed by the home AAA server 224 but via the AAA server/proxy 226. In the case when the communication device 202 is located in the coverage area of the home network (e.g. home operator), the home AAA server 224 performs the access control process without the need for an AAA server/proxy.

Figure 3:
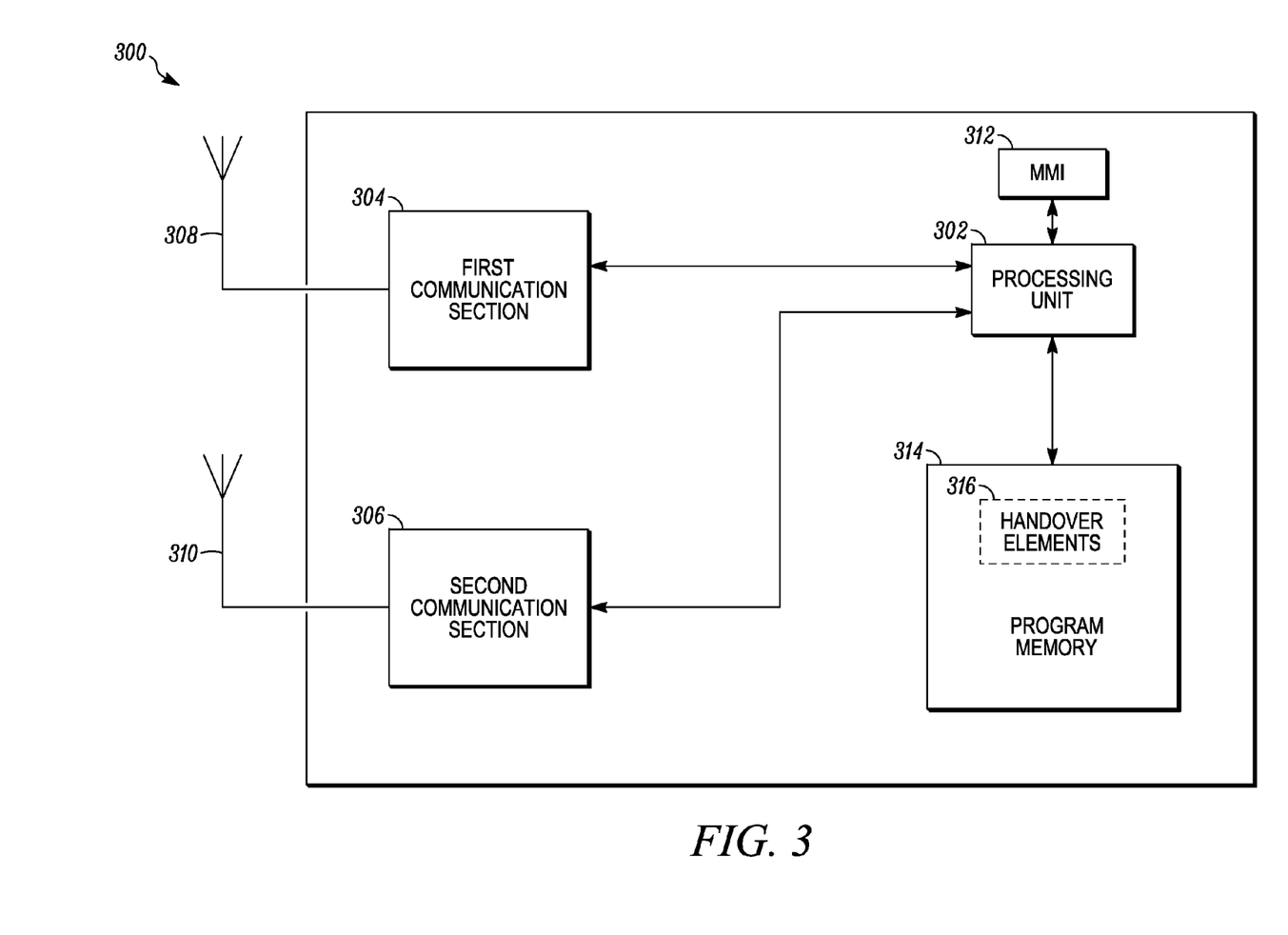
FIG. 3 is a block schematic diagram of a communication device in accordance with an example of an embodiment of the present disclosure.

FIG. 3 is a block diagram of a communication device, such as the communication device 202 shown in FIG. 2, in accordance with an embodiment of the disclosure. The communication device 202 may be a portable or mobile telephone, a Personal Digital Assistant (PDA), a wireless video or multimedia device, a portable computer, an embedded communication processor or similar wireless communication device. In the following description, the communication device will be referred to generally as User Equipment (UE) for illustrative purposes and it is not intended to limit the disclosure to any particular type of communication device. As will be apparent to a skilled person, FIG. 3 shows only the main functional components of an exemplary UE 202 that are necessary for an understanding of the invention.

The UE 202 comprises a processing unit 302 for carrying out operational processing for the UE 202. The UE 302 also has a first communication section 304 for providing wireless communication via a radio communication link with, for example, a Node B (not shown) of the UTRAN 210 of the UMTS communication system 204 and a second communication section 306 for providing wireless communication via a radio communication link with, for example, an AP 216 of the WLAN 206. The first communication section 304 is part of a UMTS radio interface of the UE 202 and the second communication section 306 is part of a WLAN radio interface of the UE 202. Each of the communication sections 304 and 306 typically includes an antenna 308, 310, a modulation/demodulation section (not shown), and a coding/decoding section (not shown), for example, as will be known to a skilled person and thus will not be described further herein. The communication sections 304, 306 are coupled to the processing unit 302. In an alternative arrangement not described herein, the first 304 and second 206 communication sections may be combined in a single RF communication section which is programmable to switch operation between the different communication systems and a single antenna.

The UE 202 also has a Man Machine Interface MMI 312, including elements such as a key pad, microphone, speaker, display screen, for providing an interface between the UE and the user of the UE. The MMI 312 is also coupled to the processing unit 302.

The processing unit 302 may be a single processor or may comprise two or more processors carrying out all processing required for the operation of the UE 202. The number of processors and the allocation of processing functions to the processing unit is a matter of design choice for a skilled person. The UE 202 also has a program memory 314 in which are stored programs containing processor instructions for operation of the UE 202. The programs may contain a number of different program elements or sub-routines containing processor instructions for a variety of different tasks, for example, for: communicating with the user via the MMI 312; processing signalling messages (e.g. paging signals) received from the UTRAN 210 and WLAN 206; and performing neighbouring coverage area measurements. Specific program elements stored in program memory 314 include handover elements (shown as a dotted block 316) for facilitating handover of the UE 202. The operation of the handover elements 316 will be described in more detail below.

Figure 4:
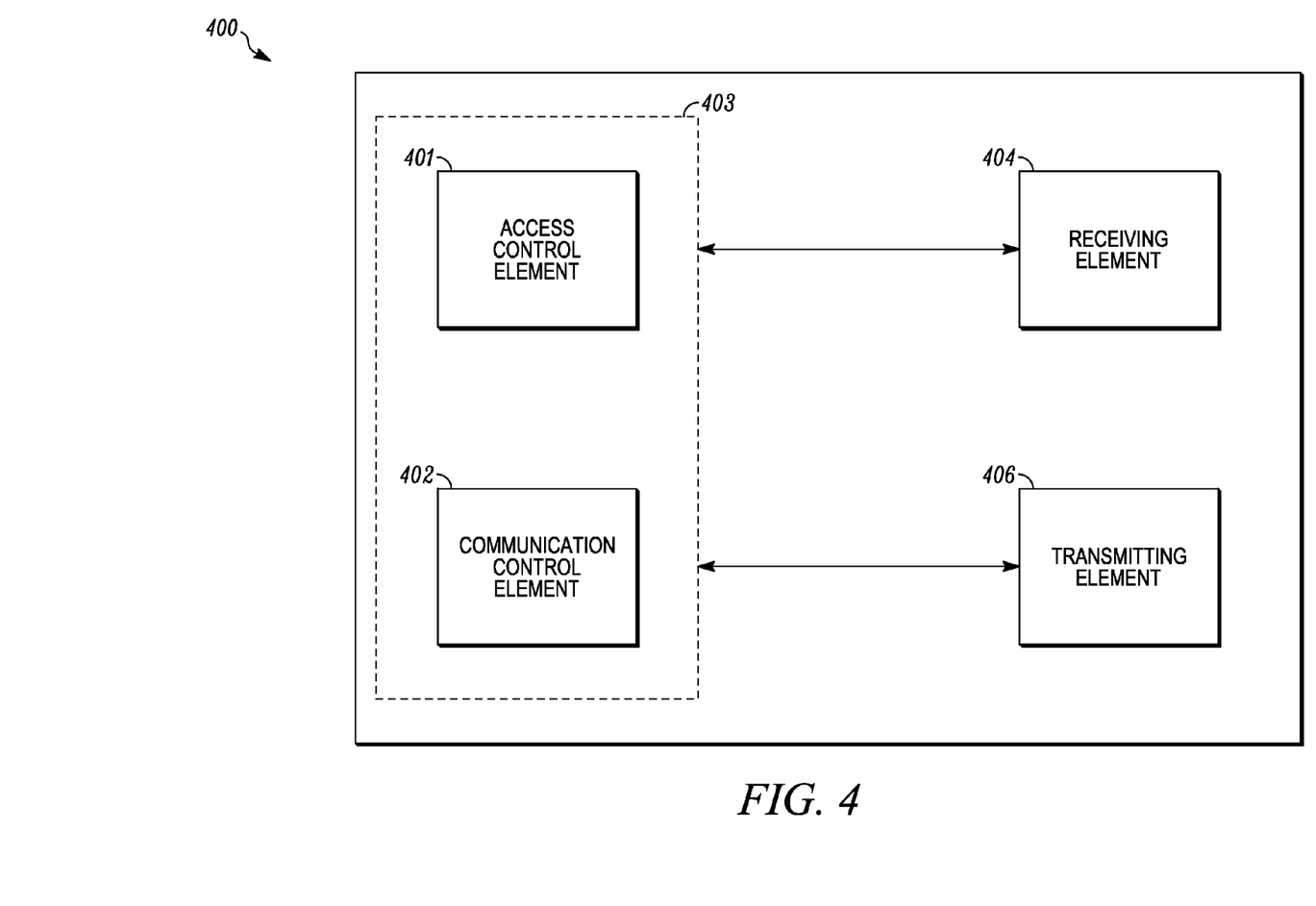
FIG. 4 is a block schematic diagram of an application server in accordance with an example of an embodiment of the present disclosure.

FIG. 4 is a block diagram of an application server, such as the application server 222 shown in FIG. 2, in accordance with an embodiment of the disclosure. The application server 222 is arranged to communicate with a first radio access network (e.g. UTRAN 210) and a second radio access network (e.g. WLAN 206) and to facilitate a handover of the UE 202 communicating with the first radio access network to a second radio access network. The application server 222 comprises an access control element 400 for initiating an access control process to authenticate and authorise the UE 202 for access to the second radio access network 206 whilst the UE 202 is active on the first radio access network 210. The expression a communication device is 'active on' a radio access network means that the communication device is authenticated and authorised to access the radio access network but the communication device may or may not be exchanging or communicating data. The application server 222 further comprises communication control element 402 for, after the second radio access network is prepared for access by the UE 202 (i.e. the UE 202 is authenticated and authorised for access to the second radio access network 206 whilst the UE 202 is still active on the first radio access network 210), initiating communication between the UE 202 and the second radio access network so as to facilitate handover of the UE 202 to the second radio access network.

The application server 222 may further comprise a receiving element 404 for receiving messages and a transmitting element 406 for transmitting messages. For example, the receiving element 404 may receive a handover request message from the UE 202 via the first radio access network requesting handover of the UE 202 from the first radio access network to the second radio access network. The access control element 400 may then be arranged to initiate an access control process in response to receiving the handover request. The receiving element 404 may also receive an access accept message after the UE 202 has been authenticated and authorised such that the second radio access network is prepared for access by the UE 202. The communication control element 402 in response to the access accept message may then be arranged to transmit a handover accept message to the UE 202 for initiating communication between the UE 202 and the second radio access network. In an example arrangement, the communication control element 402 may be arranged to forward the access accept message to the UE 202 and thus, in this arrangement the handover accept message is the access accept message.

In an example, the application server 222 may comprise one or more processing units (one processing unit 403 comprising elements 400 and 402 is shown in dotted lines as an example in FIG. 4) and the elements 400, 402, 404 and/or 406 may be subroutines that are called and run on the one or more processing units.

The operation of the elements 400, 402, 404 and 406 of the application server 222 will be described in more detail below.

Figure 5:
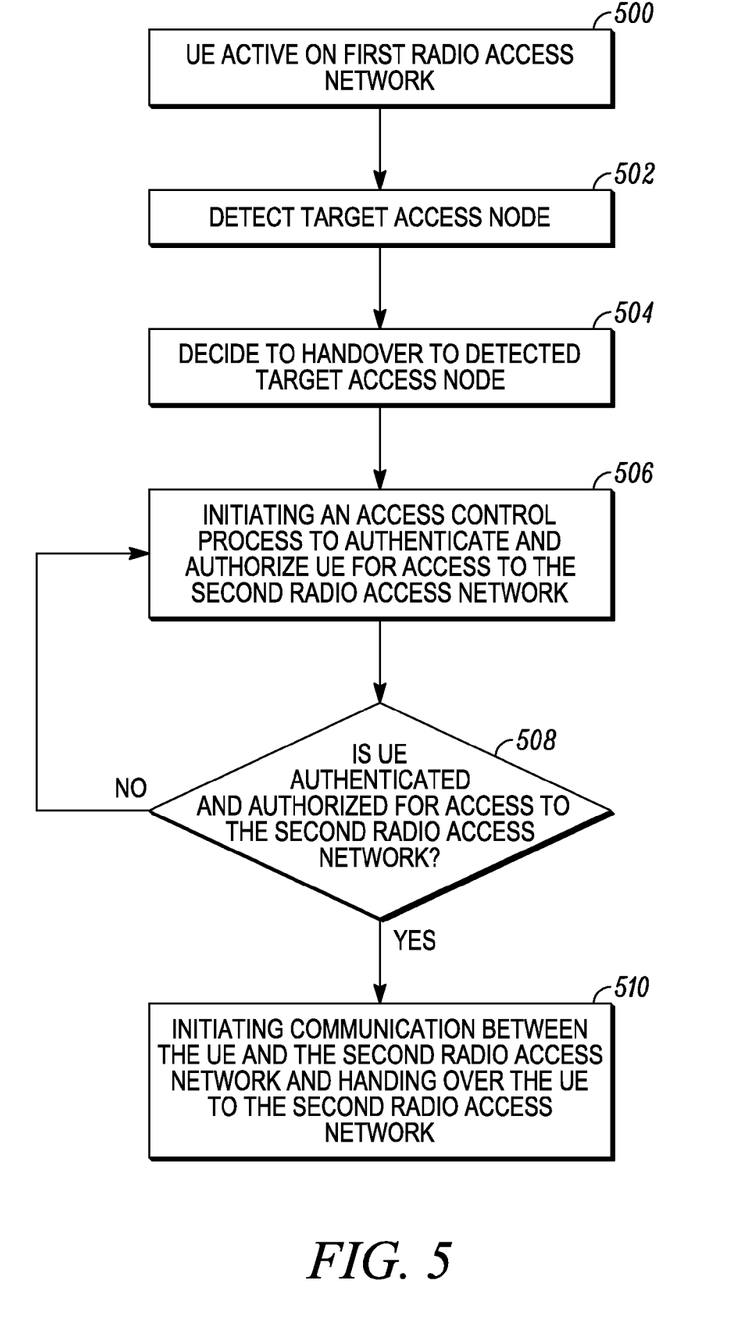
FIG. 5 is a flow diagram showing an example method for facilitating a handover of a communication device communicating with a first radio access network to a second radio access network in accordance with an embodiment of the disclosure.

FIG. 5 shows an example method for facilitating a handover of a UE (such as UE 202) active on a first radio access network, such as UTRAN 210, to a second radio access network, such as WLAN 206, in accordance with an embodiment of the disclosure. As described above, UTRAN 210 and WLAN 206 are examples of radio access networks and it is not intended to limit the invention to these particular types of radio access networks.

The example method starts whilst the UE 202 is active on the first radio access network, UTRAN 210, step 500. For example, the UE 202 is in coverage area 208 of UTRAN 210 and is active on UTRAN 210 of the UMTS communication system 204 and may be communicating with a server 232 or other data entity via the UTRAN 210 of the UMTS communication system 204. Whilst the UE 202 is active on the UTRAN 210, a target access node in a second radio access network, WLAN 206, is detected for communication with the UE 202, at step 502. Typically, the target access node is detected by the UE 202. For example, the UE 202 is also in coverage area 214 of WLAN 206 and AP 216 is detected by the UE 202 as a target access node for communication. At step 504, a decision is taken to handover the UE 202 from the UTRAN 210 to the detected target access node AP 216 in the WLAN 206. This decision is typically made by the UE 202. The decision may be based on signal strength measurements, and/or the preferred communication system of the UE 202 and/or other parameters as is well known in the art. At step 506, an access control process is initiated to authenticate and authorise the UE 202 for access to the second radio access network, WLAN 206. The access control process is initiated by the UE 202 in response to a decision to handover and prior to hand over and whilst the UE 202 is active on the WLAN 206. The access control process initiated by the UE 202 is to authenticate and authorise the UE 202 for access to the WLAN 206 so as to prepare the WLAN 206 for access by the UE 202. In order to initiate the access control process, the UE 202 acts according to or imitates the detected target access node (AP 216) so as to authenticate and authorise the UE 202 for access to the WLAN 206. In other words, the UE 202 is arranged to behave or operate as a detected target access node behaves or operates to authenticate and authorise the UE 202 for access to the WLAN 206 once or as if a handover to the target access node has been performed. In an example arrangement, the UE 202 initiates the access control process by sending a handover request message via the first radio access network 210 to the application server 222 communicably coupled to the UTRAN 210 and the WLAN 206. The handover request message includes identity information, for example, identity information of the detected target access node for use in the access control process to authenticate and authorise the UE for access to the second radio access network 206. The application server 222 initiates the access control process in response to receipt of the handover request message. By arranging for the UE 202 to initiate the access control process to authenticate and authorise the UE 202 for access once a target access node in the second radio access network has been detected, the first communication section 304 (e.g the UMTS radio interface) of the UE 202 can be used to facilitate the access control process without the need to activate the second communication section 306 (e.g. the WLAN radio interface) of the UE 202. In addition, with the UE 202 imitating or acting according to a detected target access node to authenticate or authorise the UE 202 for access to the WLAN 206, the same protocols between the UE 202, the application server and an authentication and authorisation server (e.g. the home AAA server 224 (and if necessary between an AAA server/proxy)) can be used as between the detected target access node and the authentication and authorisation server.

The access control process may include communicating by the application server 222 messages between the UE 202 and an authentication and authorisation server (e.g. home server AAA 224) for preparing the second radio access network (WLAN 206) for access by the UE 202 by facilitating the authentication and authorisation of the UE 202 for access to the second radio access network. The access control process may be initiated in response to receiving a handover request message sent by the UE 202 via UTRAN 210 and requesting handover of the UE 202 from the UTRAN 210 to the WLAN 206. For example, a handover request message may be received at the application server 222 from the UTRAN 210. The handover request message may be sent by the UE 202 when the UE 202 identifies or detects an access node (e.g. an access node such as AP 216 in WLAN 206 or for a UTRAN, a Node B) as a target access node for handover. The handover request message may include identity information for use in the access control process to authenticate and authorise the UE 202 for access to the WLAN 206. For example, the handover request message may include identify information for the identified target access node in the WLAN 206 and may also include identity information for the UE 202.

The identity of the target access node in the WLAN 206 may be used to transmit an access request message for the UE 202 for accessing the WLAN 206 to an authentication and authorisation server for authenticating and authorising the UE 202 for access to the WLAN 206. The authentication and authorising server is typically the home AAA server 224. If the UE 202 is roaming, then the access request message will be sent to the home AAA server 224 via a AAA server/proxy 226 associated with the target access node.

The access control process includes authenticating (for example verifying the identity) of the UE 202 for access to the WLAN 206 and authorising the UE 202 for access to the WLAN 206. On initiating the access control process, the application server 222 interfaces with the target WLAN (206) associated with the target AP (216) and the home AAA server 224 so as to prepare the WLAN 206 for access by the UE 202 (e.g. for handover). The authenticating and authorising steps performed by the home AAA server 224 and the WLAN 206 are well known in the art, for example, the Extensible Authentication Protocol EAP-AKA authentication method may be used. The WLAN 206 is prepared for access by the UE 202 after the UE 202 has been authenticated and authorised. In response to or once the UE 202 is authenticated and authorised for access to the WLAN 206 whilst the UE is still active on the UTRAN 210 (step 508), communication between the UE 202 and the AP 216 of the WLAN 206 may be initiated and the UE 202 can be handed over from the UTRAN 210 to the WLAN 206, step 510. The initiation of communication may include associating the UE 202 with the detected target access node and establishing communication between the UE 202 and the WLAN 206 via the detected target access node.

By initiating the access control process whilst the UE 202 is active on the UTRAN 210, the UE 202 via the application server 222 can then facilitate the authentication and authorisation of the UE 202 with the target WLAN 206 (e.g. the pre-authentication of the UE 202 with the target WLAN 206 by creating the security material, allocating an IP address for the UE, etc.) before the UE starts using the target WLAN 206.

In an example arrangement, an access accept message is received after the UE 202 has been authenticated and authorised and in response to the access accept message, a handover accept message is transmitted to the UE 202 for initiating communication between the UE 202 and the detected target AP 216 of the WLAN 206. This may include forwarding the access accept message to the UE 202 as the handover accept message.

The handover accept message may include an address (e.g. IP address) to be used by the UE 202 on the target WLAN 206. This enables the UE 202 to perform a handover to the target WLAN 206 (e.g. via a WLAN association procedure with the target AP 216) and without the need to be authenticated again with the WLAN 206 and without a need to use a DHCP or another method to obtain an IP address for use on the target WLAN 206.

Figure 6A:
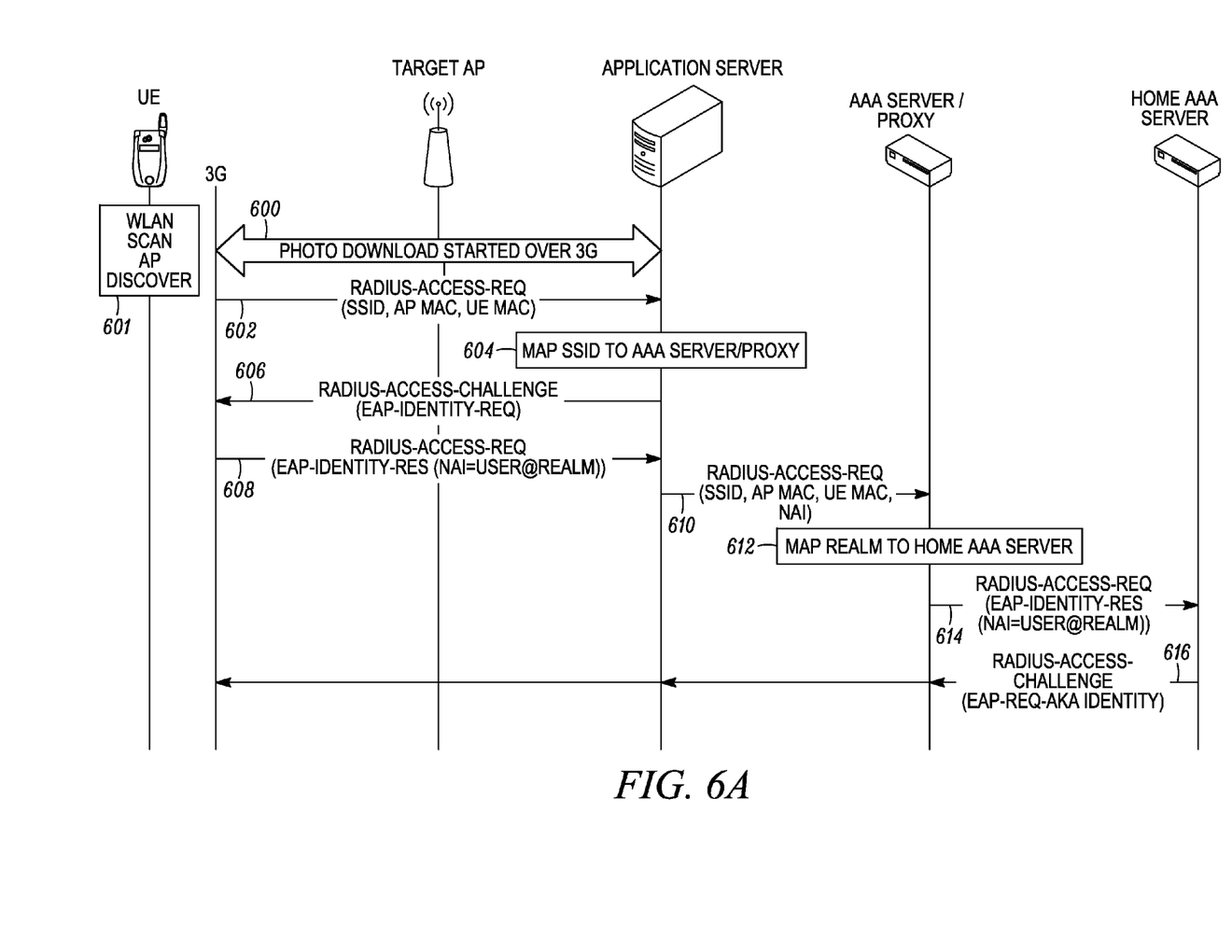
FIG. 6 is a diagram showing an example message flow for performing a handover of a communication according to the method shown in FIG. 5 in the communication system arrangement of FIG. 2.
Figure 6B:
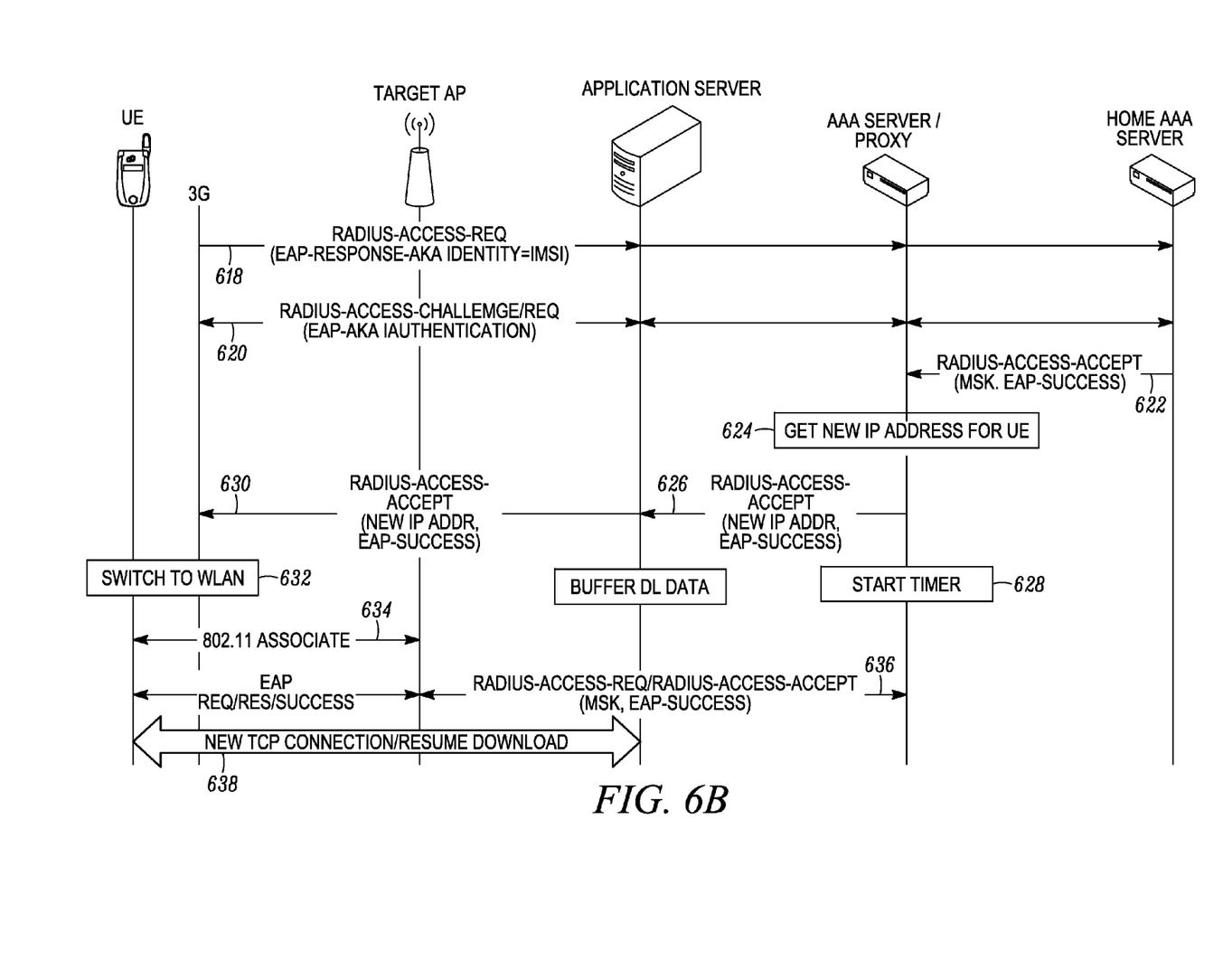

Referring now to FIG. 6 which shows an example message flow for the method in accordance with an embodiment of the disclosure when a UE 202, active on and communicating (e.g. data communication is in progress) with UTRAN 210, is handed over from a UTRAN 210 of the UMTS communication system 204 to a WLAN 206 of the WLAN communication system 207 of the communication system arrangement shown in FIG. 2. In the example message flow shown in FIG. 6, the ongoing data communication with the UE 202 and UTRAN 210 involves the transfer of photograph data between the UE 202 and the application server 222. Thus, in the described example, the application server 222 is acting as a source of data as well as an interface between the target WLAN and the UE 202 for facilitating the authentication and authorisation with the target WLAN 206. As described above, in other examples, data communication may take place between the UE 202 and other servers or entities acting as data sources and with the application server 222 acting as an interface to pre-authenticate the UE 202 with the target WLAN 206. Furthermore, data other than photograph data may be transferred or the UE 202 may only be active on the UTRAN 210 with no ongoing data communication. Thus, the following description of the application server 222 acting also as a data source to transfer photograph data is not intended to be limiting. Some or all of the handover operations of the UE 202 described below may be performed by the processing unit 302 according to the handover elements 316 stored in program memory 314.

In step 600, the UE 202 is active on and communicating with the UTRAN 210 of the UMTS communication system 204 and data is being transferred between the UE 202 in the form of a file (e.g. photograph) download. During the file download, the UE 202 performs scans for neighbouring coverage areas, in this case including a WLAN scan step 601, and discovers or detects an AP 216 with acceptable signal strength and Service Set Identifier (SSID). The UE 202 decides to handover the UE 202 from the UTRAN 210 to the detected target AP 216 and in response to the decision to handover but prior to the handover taking place and whilst still active on UTRAN 210, the UE 202 initiates an access control process to authenticate and authorise the UE 202 for access to the WLAN 206 by sending a handover request message to the application server 222 via the UTRAN 210. The application server 222 then initiates an access control process in response to receiving the handover request message from the UE 202, to prepare the WLAN 206 for access by the UE 202. Only after successfully completing the access control process for the WLAN 206 (ie. once the WLAN 206 is prepared for access by the UE 202 and the UE 202 has been authenticated and authorised), the UE 202 switches from the UTRAN 210 to the WLAN 206 and continues the file download with minimum interruption and zero packet loss. Thus, the UE 202 uses the UMTS radio interface (first communication section 304) for the data communication until the access control process for the WLAN 206 has been completed successfully and only then switches to the WLAN radio interface (second communication section 306).

On discovering or detecting an AP 216 with acceptable signal strength and SSID, the UE 202 sends, step 602, a handover request message (e.g. RADIUS Access Request message) to the application server 222 containing the SSID and the MAC address of the discovered or target AP 216 in the WLAN 206 associated with the target AP, as well as the MAC address of the WLAN interface of the UE 202. This handover request message is received at the receiving element 404 and is a signal to the application server 222 that the UE 202 wants to handover to the indicated AP and to initiate the access control process. The use of RADIUS protocol is only an example. Any other suitable protocol (even proprietary) could be used.

The RADIUS Access Request message is normally sent by an access node when a new UE is trying to access the access node. Thus, the UE 202 acts according to or imitates or behaves as if it were a target access node by sending the RADIUS Access Request message to the application server 222.

The access control element 400 of the application server 222 initiates, in response to receiving the handover request message, the access control process which includes mapping the received SSID of the detected target AP 216 to the IP address of the AAA Server/Proxy 226 in the target WLAN 206 associated with the target AP 216, step 604. This mapping can be pre-configured in the application server 222 or could be based on DNS resolution.

The application server 222 behaves as an authenticator element for the UE 202 and issues an Extensible Authentication Protocol (EAP) Identity Request which is embedded in a RADIUS Access Challenge message and which is sent to the UE 202 via the transmitting element 406, step 606. At step 608, the UE 202 responds, as normal on receipt of an EAP Identity Request, with an EAP Identity Response including its Network Access Identifier (NAI), which can be either an IMSI value or a "username@real" identifier. The real part identifies the home operator of the UE, e.g. wlan.operator.org.

The application server 222 forwards an access request message requesting access by the UE 202 (identified e.g. by the NAI) to the detected target access node (identified e.g. by the SSID) of the target WLAN 206 (e.g. RADIUS Access Request message including SSID, AP MAC, UE MAC and NAI) to the AAA Server/Proxy 226 in the target WLAN or associated with the target WLAN, step 610. This AAA Server/Proxy 226 is configured (as part of a roaming agreement between the operator of the application server 222 and the target WLAN operator) to accept access request messages from the application server 222. From the AAA Server/Proxy viewpoint, the application server 222 is emulating an AP that requests WLAN access for a particular UE. The AAA Server/Proxy 226 discovers the address of the Home AAA server 224 for this UE 202 by using the realm in the NAI field, step 612. The mapping between realm and Home AAA Server 224 can be preconfigured and done with a DNS query.

In response to the access request message from the application server 222, the AAA Server/Proxy 226 in the target WLAN 206 sends (step 614) a RADIUS Access Request message to the home AAA server 224 in order to facilitate the access control process including authentication and authorization steps according to the known procedure for the UE 202. Although not shown in FIG. 6, when the UE 202 is located in the home network, the application server 222 sends the access request message to the home AAA server 224 without the need to use a AAA Server/Proxy.

As is well known, the home AAA server 224 authenticates the UE 202 (e.g. with EAP-AKA authentication method or any other authentication method) via the AAA Server/Proxy 226 in the target WLAN and via the application server 222. Steps 616, 618 and 620 show the messages that pass between the UE 202 and the home AAA server 224 according to the known EAP-AKA authentication method via the application server 222 and the AAA Server/Proxy 226 in order to authenticate the UE 202 for the target AP 216 of the target WLAN 206 and authorise the UE 202 for access to the target WLAN 206.

If the authentication procedure is successful such that the target WLAN 206 is prepared for access by the UE 202, the home AAA server 224 sends an access accept message (RADIUS Access Accept message) to the AAA Server/Proxy 226 including an EAP Success packet and a Master Session Key (MSK), step 622. This MSK, as explained in the EAP-AKA specification (RFC 4187), is used to derive the security keys to protect the UE-AP communication. The AAA Server/Proxy 226 reserves an IP address for the UE 202, e.g. from the local DHCP server 228, step 624. This address belongs to the IP address space of the target WLAN 206 and can be used by the UE 202 after associating with the AP 216.

The AAA Server/Proxy 226 forwards the access accept message (RADIUS Access Accept message) to the receiving element 404 of the application server 222, step 626, and starts a timer, step 628. The timer is not shown in FIG. 2 but is typically part of the AAA Server/Proxy 226. As long as the timer is running, the AAA Proxy/Server 226 accepts the UE 202 to access the target WLAN 206 via the target AP 216 without authentication (since the UE has already been successfully authenticated).

Subsequently, the application server 222 under the control of the communication control element 402 forwards the access accept message (RADIUS Access Accept message), including the IP address assigned to the UE 202 for use with the target WLAN 206, as a handover accept message to the UE 202, step 630, and stops sending any further downlink packets to UE 202. This is because the RADIUS Access Accept message is virtually a handover command for the UE 202, which triggers the UE 202 to cease communication on the UTRAN 210 via the UMTS radio interface and start communication with the target AP 216.

When the UE 202 receives the access accept message (RADIUS Access Accept message), the UE 202 hands over or switches to the WLAN 206, step 632. The UE 202 first associates with the target AP 216 by using the normal 802.11 procedures, step 634, and then the normal EAP-based authentication is commenced. In this case, however, the AAA Server/Proxy 226 responds immediately, (e.g. substantially immediately) or without performing further access control process steps, to the AP 216 with a RADIUS Access Accept message, assuming the timer started in step 628 is still running, step 636. Consequently, the WLAN access control procedure is considerably reduced and the handover procedure is performed significantly faster. In addition, the UE 202 does not use DHCP to get an IP address since this address was already sent to the UE 202 in step 630. This further reduces the handover delay.

The UE 202 then at step 638 establishes a new TCP connection to the application server 222, which is an indication for the application server 222 that the handover is completed. The application server 222 learns the IP address assigned to the UE 202 for use with the WLAN 206 before the UE 202 moves to the WLAN 206. So, the application server 222 resumes the file download over the new TCP connection. Note that apart from a short interruption to the downlink data flow, no downlink packets are lost.

The need to establish the new TCP connection and the delay from the associated TCP slow start can be avoided if the application server 222 implements MIPv4 foreign agent (FA) functionality. In this case, after step 636, the UE 202 may send a FA-Binding Update to the application server 222, which then forwards subsequent downlink packets to the new IP address of the UE 202. However, this adds extra complexity and implementation cost in the UE 202 and does not provide significant performance benefits.

Since the application server 222 acts as an interface between the UE 202 and the target WLAN 206, the UE 202 can be authenticated and authorised with the target WLAN 206 using the UMTS radio interface 304 of the UE 202 without the need to use the WLAN radio interface 306 of the UE 202. This avoids any issues of using two radio interfaces simultaneously, including power consumption, and for UEs that cannot operate two radio interfaces simultaneously, as discussed in the introduction.

As a variation to the message flow of FIG. 6, once the home AAA server 224 sends an access accept message (RADIUS Access Accept message) to the AAA Server/Proxy 226 including an EAP Success packet and a Master Session Key (MSK) (step 622) after the authentication procedure is successful, the AAA Server/Proxy 226 may also send an unsolicited message to the target AP 216, called "UE Authorized" message, which indicates to the target AP 216 that the UE 202 is pre-authenticated and pre-authorized to use the AP 216. This UE Authorized message includes the MAC address of the UE 202 and the MSK, which is normally required by the AP to create the Wi-Fi Protected Access (WPA) session keys. The "UE Authorized" message can be an unsolicited RADIUS Access Accept, which would be discarded by a normal AP, unless it is appropriately modified to comply with the variation specified here. When the AP 216 receives the "UE Authorized" message, it starts a timer and, as long as this timer is running, the AP 216 accepts an UE 202 having a MAC address corresponding to the MAC address in the UE Authorized message with no authentication. So, after the UE 202 associates with the AP 216 (e.g. as in step 634 of FIG. 6), only a 4-way handshake is performed between the UE 202 and the AP 216 to agree the security keys, as per IEEE 802.11i (the AP 216 sends an EAP-Success message immediately to UE 202 without any signalling with the AAA Server/Proxy 226 which signalling is required by step 636 in FIG. 6).

This variation expedites a little more the handover procedure but it requires modifications on the AP 216.

In summary, the present disclosure provides for the UE to be authenticated and authorized for access to a second radio access network (e.g WLAN) before the UE starts using the second radio access network and whilst still active on a first radio access network. This is accomplished by having the UE initiate an access control process to authenticate and authorise the UE for access to the second radio access network and in an example arrangement, an application server to serve as a WLAN pre-authenticator element, i.e. as an entity that prepares the WLAN to accept the UE (e.g. create the security material, allocate an IP address for the UE, etc) before the UE starts using the WLAN. Since the UE is authenticated and authorized for WLAN access before the UE starts using the WLAN, the present disclosure enables handovers from UTRAN to WLAN without the need to operate simultaneously the UMTS and the WLAN radio interfaces and so enables a single radio interface handover. In this way, the UE does not need to implement techniques to address the UMTS-WLAN co-existence issues and the battery life of the UE can be increased considerably. Furthermore, since the UE is authenticated and authorized for WLAN access before the UE starts using the WLAN, the interruption with the ongoing data communication when the UE hands over to WLAN can be minimised.

In the foregoing specification, the invention has been described with reference to specific examples of embodiments of the invention. It will, however, be evident that various modifications and changes may be made therein without departing from the broader scope of the invention as set forth in the appended claims.

Some of the above embodiments, as applicable, may be implemented using a variety of different processing systems. For example, the Figures and the discussion thereof describe an exemplary architecture which is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between program elements are merely illustrative and that alternative embodiments may merge elements or impose an alternate decomposition of functionality upon various elements.

The invention claimed is:

1. A method for facilitating a handover of a communication device active on a first radio access network to a second radio access network, the method comprising:
   whilst the communication device is active on the first radio access network, detecting a target access node in the second radio access network for communication with the communication device;
   deciding to handover the communication device from the first radio access network to the detected target access node in the second radio access network;
   in response to a decision to handover and prior to handing over, initiating by the communication device an access control process to authenticate and authorise the communication device for access to the second radio access network, initiating an access control process including sending by the communication device a handover request message via the first radio access network to an application server communicably coupled to the first and second radio access networks to initiate the access control process, the handover request message including identity information of the detected target access node for use in the access control process; and
   after the communication device is authenticated and authorised to access the second radio access network whilst the communication device is still active on the first radio access network, initiating communication between the communication device and the detected target access node in the second radio access network and handing over the communication device from the first radio access network to the detected target access node in the second radio access network.

2. The method of claim 1, wherein initiating an access control process includes the communication device imitating the detected target access node in the second radio access network and initiating an access control process to authenticate and authorise the communication device for access to the second radio access network, as if the communication device had already handed over to the detected target access node in the second radio access network.

3. The method of claim 1, wherein the handover request message further includes identity information for the communication device.

4. The method of claim 1, wherein initiating an access control process further comprises receiving by an application server communicably coupled to the first and second radio access networks the handover request message from the communication device and in response to receipt of the handover request message initiating the access control process, the access control process including communicating by the application server messages between the communication device and an authentication and authorisation server for facilitating authentication and authorisation of the communication device for access to the second radio access network.

5. The method of claim 4, further comprising receiving at the application server an access accept message after the communication device is authenticated and authorised for access to the second radio access network, and in response to the access accept message, transmitting by the application server a handover accept message to the communication device for initiating communication between the communication device and the second radio access network and handing over the communication device to the detected target access node.

6. The method of claim 5, wherein the handover accept message is the access accept message and transmitting includes forwarding the access accept message to the communication device.

7. The method of claim 5, wherein the handover accept message includes an address assigned to the communication device for use by the communication device with the second radio access network.

8. The method of claim 5, wherein the initiating communication includes associating the communication device with the detected target access node and establishing communication between the communication device and the second radio access network via the detected target access node.

9. A communication device including:
   a first communication section for communicating with a first radio access network;
   a second communication section for communicating with a second radio access network;
   a processing unit being arranged to:
      whilst the communication device is active on the first radio access network, detect a target access node in the second radio access network for communication with the communication device;
      decide to handover the communication device from the first radio access network to the detected target access node in the second radio access network;
      in response to a decision to handover and prior to handing over, initiate an access control process, to authenticate and authorise the communication device for access to the second radio access network, by sending a handover request message via the first radio access network to an application server communicably coupled to the first and second radio access networks to initiate the access control process, the handover request message including identity information of the detected target access node for use in the access control process; and
      after the communication device is authenticated and authorised to access the second radio access network whilst the communication device is still active on the first radio access network, initiate communication between the communication device and the detected target access node in the second radio access network and facilitate hand over of the communication device from the first radio access network to the detected target access node in the second radio access network.

10. The communication device of claim 9, wherein the processing unit being arranged to initiate an access control process includes the processing unit being arranged to operate the communication device so as to imitate the detected target access node in the second radio access network and to initiate an access control process to authenticate and authorise the communication device for access to the second radio access network, as if the communication device had already handed over to the detected target access node in the second radio access network.

11. The communication device of claim 9, wherein the handover request message further includes identity information for the communication device.

12. An application server for communicating with a first radio access network and a second radio access network for facilitating a handover of a communication device active on a first radio access network to a second radio access network, the application server comprising:
- a receiving element for receiving a handover request message from the communication device via the first radio access network, the handover request message being generated by the communication device in response to detecting a target access node in the second radio access network for communication and deciding to handover the communication device from the first radio access network to the detected target access node in the second radio access network and prior to handing over;
- an access control element for initiating, in response to receipt of the handover request message, an access control process to authenticate and authorise the communication device for access to the second radio access network; and
- communication control element for, after the communication device is authenticated and authorised to access the second radio access network whilst the communication device is still active on the first radio access network, initiating communication between the communication device and detected target access node in the second radio access network so as to facilitate handover of the communication device from the first radio access network to the detected target access node in the second radio access network.

13. The application server of claim 12, wherein the access control element is further arranged to facilitate the access control process by communicating messages between the communication device and an authentication and authorisation server for facilitating authentication and authorisation of the communication device for access to the second radio access network.

14. The application server of claim 12, wherein the receiving element is further arranged to receive an access accept message after the communication device is authenticated and authorised for access to the second radio access network, and wherein the communication control element in response to the access accept message is arranged to transmit a handover accept message to the communication device for initiating communication between the communication device and the detected target access node in the second radio access network and facilitating handover of the communication device to the detected target access node.

15. The application server of claim 14, wherein the handover accept message is the access accept message and the communication control element is arranged to forward the access accept message to the communication device.

16. The application server of claim 14, wherein the handover accept message includes an address assigned to the communication device for use by the communication device with the second radio access network.

17. The application server of claim 12, wherein the handover request message includes identity information for the detected target access node in the second radio access network, and wherein the access control element is arranged, in response to the identity information for the detected target access node, to transmit an access request message for the communication device for accessing the second radio access network to a server for authenticating and authorising the communication device for access to the second radio access network.

18. A communication system arrangement comprising a first radio access network, a second radio access network and at least one communication device for communicating with the first and second radio access networks, the communication system arrangement further comprising:
- an application server communicably coupled to the first radio access network and the second radio access network for facilitating a handover of a communication device active on the first radio access network to the second radio access network, the application server comprising:
- a receiving element for receiving a handover request message from the communication device via the first radio access network, the handover request message being generated by the communication device in response to detecting a target access node in the second radio access network for communication and deciding to handover the communication device from the first radio access network to the detected target access node in the second radio access network and prior to handing over;
- an access control element for initiating, in response to receipt of the handover request message, an access control process to authenticate and authorise the communication device for access to the second radio access network; and
- communication control element for, after the communication device is authenticated and authorised to access the second radio access network whilst the communication device is still active on the first radio access network, initiating communication between the communication device and detected target access node in the second radio access network so as to facilitate handover of the communication device from the first radio access network to the detected target access node in the second radio access network.

19. The communication system arrangement of claim 18, wherein the receiving element is further arranged to receive an access accept message after the communication device is authenticated and authorised for access to the second radio access network, and wherein the communication control element in response to the access accept message is arranged to transmit a handover accept message to the communication device for initiating communication between the communication device and the detected target access node in the second radio access network, the communication system arrangement further comprising:
- an authentication and authorisation server associated with the detected target access node and communicably coupled to the application server, the authentication and authorisation server including a timer, the authentication and authorisation server being arranged to start the timer in response to the access accept message being sent to the application server;
- in response to the communication device initiating communication with the detected target access node, the detected target access node being arranged to send an access request message to the authentication and authorisation server, provided time of the timer has not expired, the authentication and authorisation server being arranged to respond to the access request message from the detected target access node without performing further access control process steps so as to complete the handover of the communication device to the second radio access network.

* * * * *